United States Patent [19]

Sachs

[11] 3,768,769
[45] Oct. 30, 1973

[54] PNEUMATIC MEANS FOR PRODUCTION OF MOLDED STRUCTURES

[76] Inventor: Carrol C. Sachs, 9938 Clybourn Ave., Sunland, Calif. 91352

[22] Filed: Mar. 29, 1971

[21] Appl. No.: 129,039

[52] U.S. Cl. .................................. 249/65, 249/178
[51] Int. Cl. ............................................ B28b 7/30
[58] Field of Search ...................... 249/65, 127, 152, 249/178

[56] References Cited
UNITED STATES PATENTS

| 2,977,658 | 4/1961 | Smith et al. | 249/65 |
| 3,648,963 | 3/1972 | Smith | 249/65 |
| 3,561,079 | 2/1971 | Anderson | 425/417 |
| 3,104,441 | 9/1963 | Smith | 249/65 |
| 3,101,519 | 8/1963 | Smith | 249/65 |

FOREIGN PATENTS OR APPLICATIONS

| 673,261 | 6/1952 | Great Britain | 249/65 |
| 207,677 | 4/1957 | Australia | 249/65 |

Primary Examiner—J. Spencer Overholser
Assistant Examiner—B. D. Tobor
Attorney—Max Geldin

[57] ABSTRACT

Pneumatic means comprising a hollow mandrel or hollow tube having secured around its outer surface along the length thereof according to one embodiment, a flexible open-cell polyurethane foam sleeve and an outer skin formed of a flexible non-permeable plastic such as a vinyl plastic skin adhesively secured to the outer surface of the flexible open-cell foam sleeve, and air passages for communication between the interior of the mandrel and the open-cell foam sleeve, the resulting assembly being positioned in a mold for production of cored structural panels. In operation the tool assembly is placed under pressure and expanded to force the plastic skin of the assembly outwardly during pouring and setting of the construction material, e.g., a cement or cement-polymer composition in a mold, and after setting thereof the tool assembly is subjected to reduced pressure or a vacuum to withdraw the plastic skin from the set composition, e.g., in the form of a molded panel, to facilitate removal of the tool from the molded panel, thereby forming a cored construction material or panel. Also included as a feature, pneumatic means in the form of a bellows arrangement comprising an external flexible, e.g., rubber, corrugated member, and in the interior of such corrugated member a permeable open-cell, e.g., polyurethane, foam, and tensioning means, said bellows being inflatable for applying pressure to force a contact, e.g., honeycomb, member mounted on the bellows, against an outer surface of a casting composition in a mold, to form an outer surface for a structural molded panel, and which bellows can be deflated to facilitate removal of the pneumatic tool and associated members from the mold following setting of the panel construction. Also included, means providing a combination or arrangement of a plurality of both said mandrel and bellows assemblies for provision of a cored molded structural panel containing outer surfaces of a predetermined, e.g., smooth or textured, configuration.

11 Claims, 21 Drawing Figures

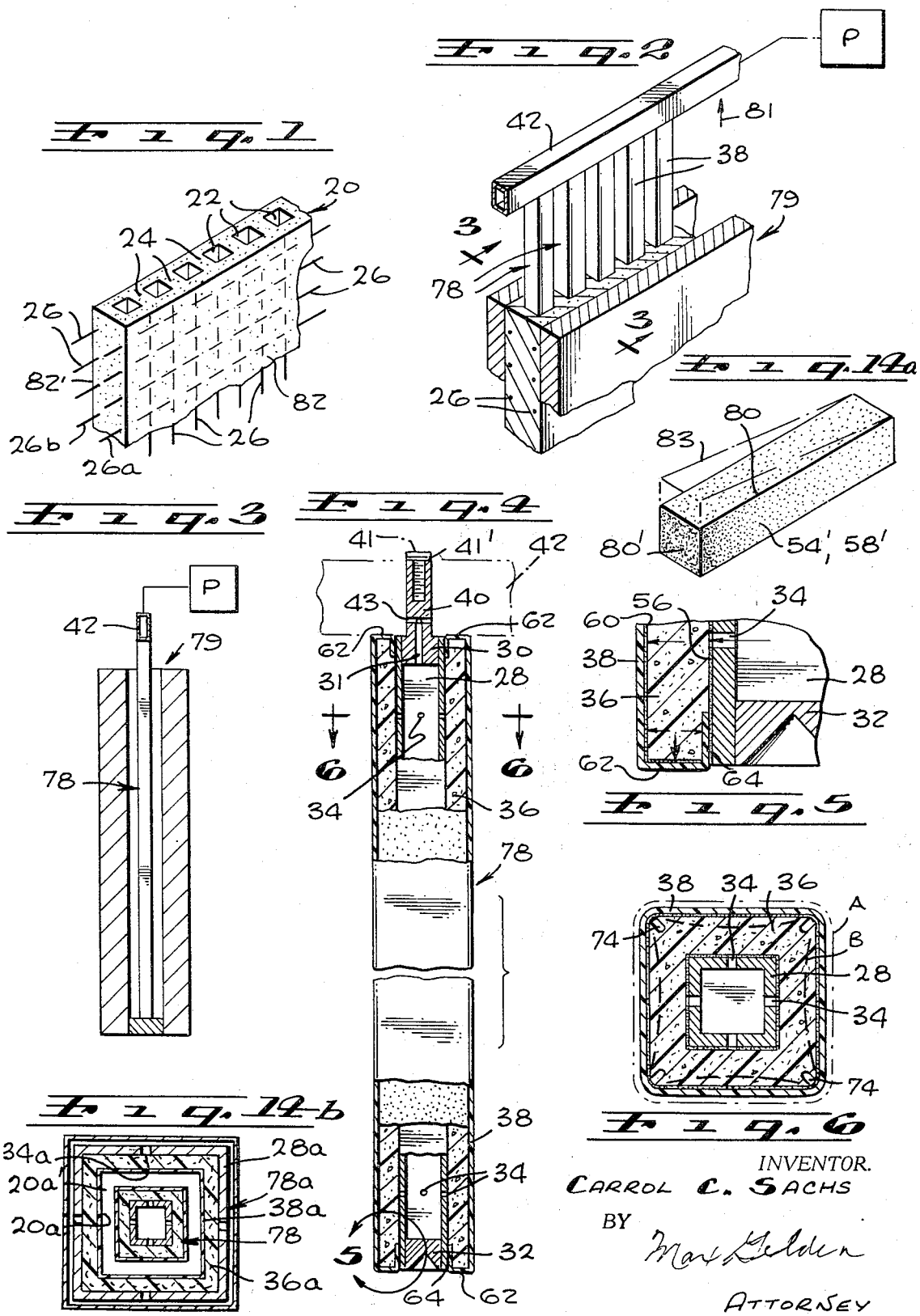

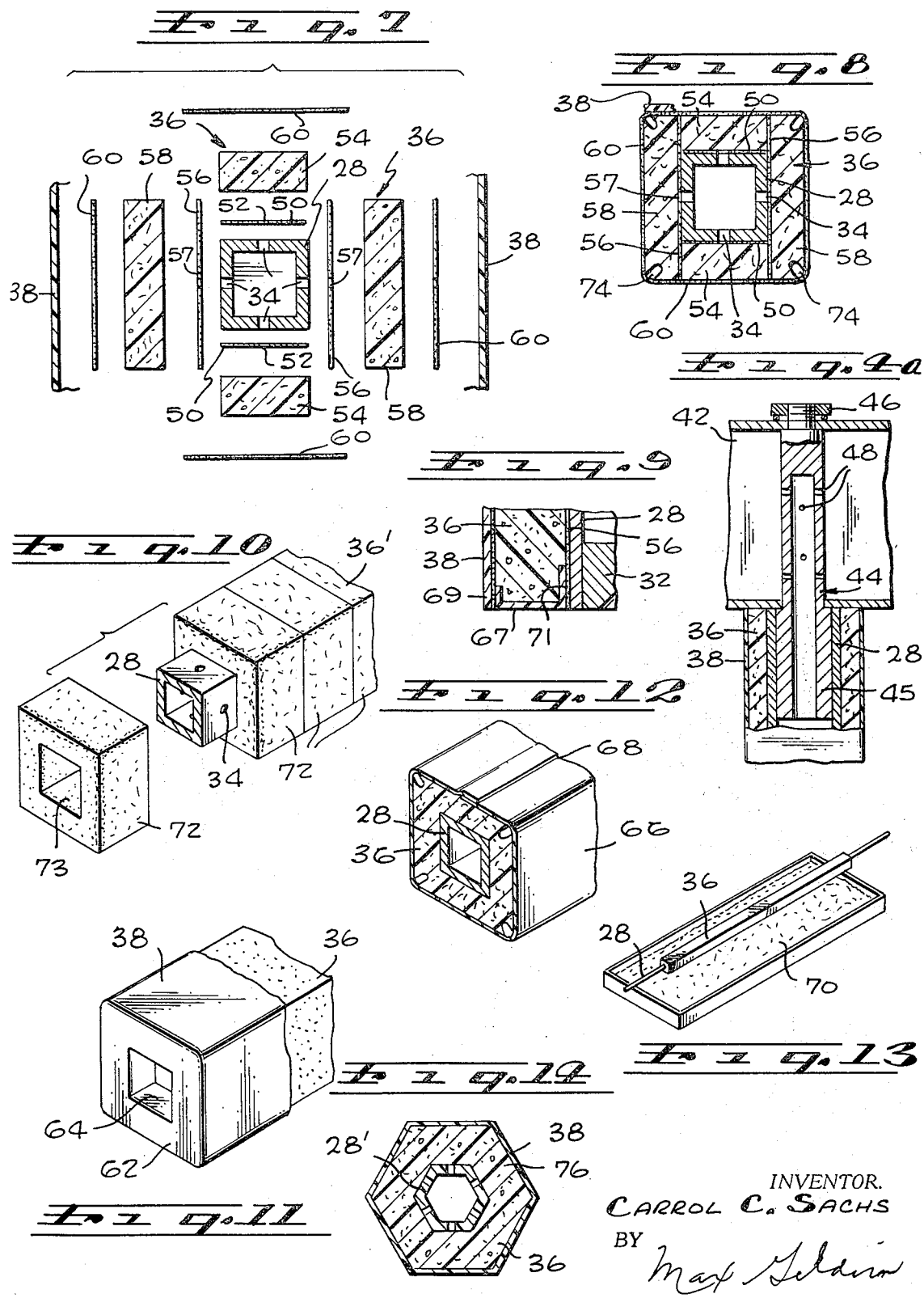

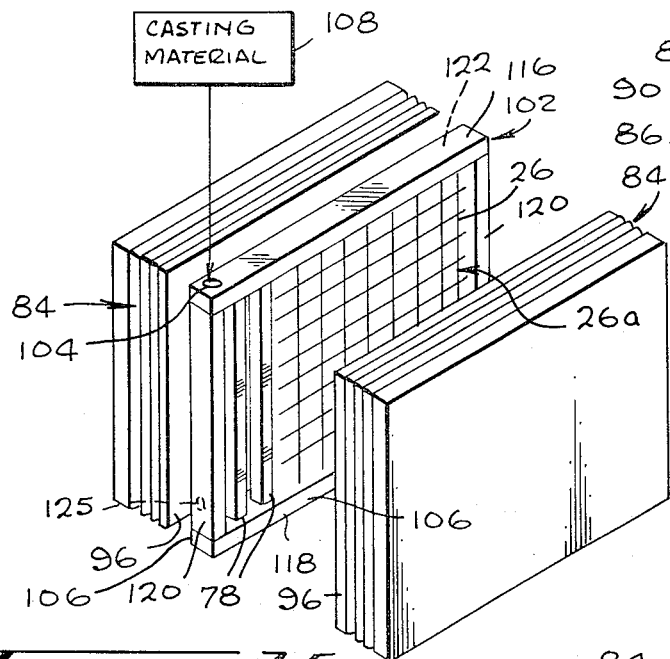
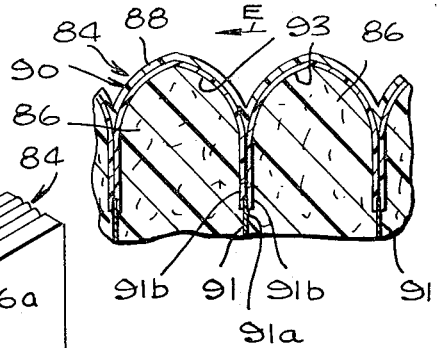
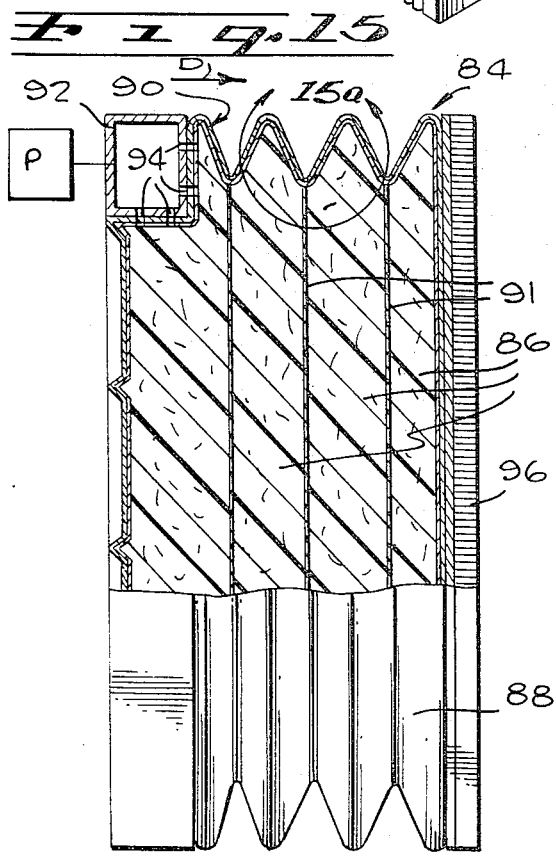
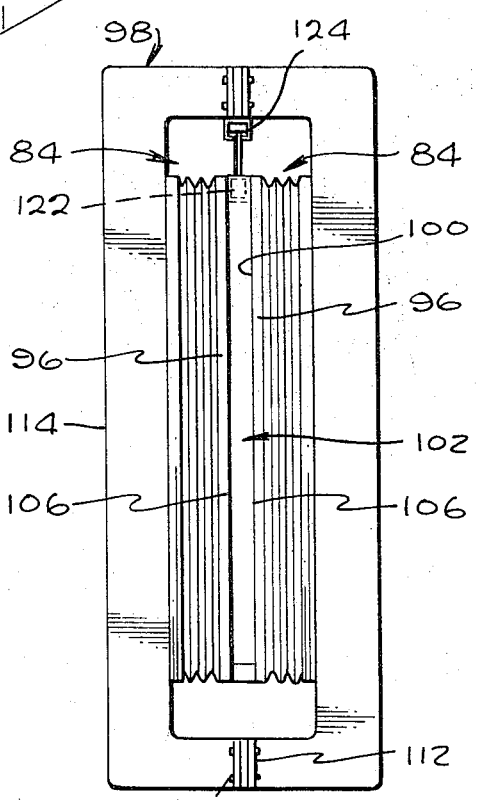
INVENTOR.
CARROL C. SACHS
BY
Max Geldin
ATTORNEY

PNEUMATIC MEANS FOR PRODUCTION OF MOLDED STRUCTURES

This invention relates to novel pneumatic means or tools for production of molded construction materials, particularly designed for formation into molded panels and other structural shapes for general construction purposes, and is particularly concerned with the provision of specially designed mandrels, bellows and associated means, which can be operated pneumatically and placed under pressure in a mold during pouring and setting of a casting, e.g., cement, composition, and placed under reduced pressure or a vacuum to facilitate removal of the tools following setting of the casting composition, and particularly designed for use in the fabrication of cored structural panels.

There has developed in recent years especially for use in residential as well as in commercial building construction, a need for large panels of molded casting, e.g., cement-containing, compositions, for wall, floor and roof construction, and particularly adapted for prefabrication at a factory site, and for transporting of such prefabricated structures to the building site. Panels of this type generally are cored, that is, contain a multiplicity of hollow cores of various configurations, such cores generally extending throughout the entire length or height of the panel. The cores of the panel may be employed as electrical conduits or as fluid passage means for transporting air, water or any other suitable fluid. Such cores may be filled with insulation for improved thermal control. Further, panels of this type require undamaged outer surfaces either of a smooth, e.g., planar, configuration, or of a predetermined other configuration, e.g., of an artistic design or facing.

In the production of molded cement or cement composition panels of large size and which are cored and surfaced as noted above, it is necessary to employ suitable tools, which are inserted into the mold during pouring and setting of the casting, e.g., cement composition, and are withdrawn following setting. Particularly where, for example, a relatively large number of tools are employed in a single mold for providing a single large cored panel, it is necessary that such tools be capable of being rapidly withdrawn from the molded composition without sticking to the molded panel structure and also without injuring the surfaces of the usually only partially set panel structure, with which the tools are in contact during pouring of the casting composition and setting thereof, so as to provide suitably cored panels, the walls of the cores being smooth and undamaged, and having outer undamaged surfaces of predetermined, e.g., smooth, configuration. The ability especially to provide for facile and rapid withdrawal of the tools from a mold following setting of the panels therein is especially important so as to permit rapid and economical operation and production.

According to the present invention, pneumatic tools in the form of specially designed mandrels, bellows and associated means in combination therewtih have been developed to achieve the above purposes. According to one feature of the invention, there is provided a pneumatic mandrel assembly for production of cored molded panels, which comprises a mandrel in the form of a hollow rigid tube, a flexible fluid permeable sleeve of substantial thickness positioned around and adhesively secured to the outer periphery of said tube, a thin outer flexible elastomeric non-permeable sheet adhesively secured around the outer periphery of said sleeve, said tube being apertured and providing fluid communication between said tube and said sleeve, and pneumatic means connected to said tube to apply fluid pressure or a vacuum to the interior of said tube and said sleeve. Thus, according to one embodiment, a mandrel comprising a metal, e.g., aluminum, hollow tube is provided with predetermined spaced holes therein, which communicate with a permeable open cell, flexible, e.g., polyurethane, foam outer sleeve which is securely adhered to the outer surfaces of the tube, and a non-permeable flexible plastic sheath or skin is securely disposed around the flexible permeable foam sleeve, the permeable foam sleeve and non-permeable outer plastic skin extending substantially the entire length of the mandrel. This structure permits compression of the outer flexible sleeve and outer plastic skin carried on the tube against a casting, e.g., a cement, composition poured into a mold, so as to form a core in the molded composition, and permits deflation of the flexible sleeve and outer skin assembly around the mandrel following setting of the surrounding molded structure in the mold, following at least partial setting, to remove the outer skin of the mandrel assembly from contact with the adjacent walls of the core and allowing rapid removal of the mandrel assembly from the mold without injury to the surface characteristics of the cored construction or panel.

A substantial number of such mandrel assemblies, including the outer flexible foam sleeve and plastic skin, all can be attached to or mounted on a header or manifold assembly for simultaneous application of pressure to all of the inflatable mandrel assemblies during the molding operation, and for simultaneous application of a vacuum to all of such assemblies following molding to facilitate removal of the mandrel assemblies as noted above.

Also, in the production of large structural cored panels as noted above, the molding of the sides of the panels is facilitated by provision of additional pneumatic means employed in operative association with the above described pneumatic mandrels, in the form of a bellows assembly or arrangement. Thus, according to another feature of the invention there is provided a pneumatic bellows assembly for production of molded panels, which comprises a flexible non-permeable outer, e.g., corrugated member, a flexible open cell plastic foam which is maintained or foamed in position within said flexible outer member of said bellows by suitable tensioning or restraining means, e.g., a plurality of permeable flexible plastic foam segments in said bellows disposed between individual corrugations of said flexible corrugated outer member and a flexible permeable tensioning sheet bonded between adjacent said flexible plastic foam segments, a contact plate mounted on one end of said bellows assembly, and pneumatic means connected to said belows assembly to apply fluid pressure or a vacuum to the interior of said bellows assembly, whereby expansion of said bellows assembly to permit contact of said contact plate with a casting material in a mold, provides a panel having an outer surface of a predetermined contour such as a smooth outer surface, formed by the contact plate of said bellows assembly.

According to the above feature of the invention, a bellows assembly is provided having a flexible accordion shaped, e.g., corrugated, rubber member enclosing a plurality of segments of open-cell permeable flexible, e.g., polyurethane, foam, such segments being positioned between adjacent corrugations and being secured together by means of a tensioning sheet, e.g., a fiberglass scrim, bonded to the adjacent foam segments and to the interior surface of the adjacent corrugations, with a contact plate, e.g., in the form of a honeycomb panel, mounted on one end of the bellows and a header arrangement mounted on the other end of the bellows and having holes therein for air communication from the header to the interior of the bellows for application of pressure or a vacuum for inflating or deflating same. A pair of such bellows is employed according to a feature of the invention, and the contact plates, e.g., in the form of the above honeycomb panels, are suitably arranged and maintained in position in a casting cell, so that upon inflation of the bellows during pouring and setting of the panel, such contact plates define the outer surfaces of the panel to be molded in the cell, and upon deflation of the bellows, withdrawal of such contact plates or honeycomb members from the sides of the molded panel is permitted, to facilitate removal of the molded panel and bellows assembly from the casting cell or mold.

According to still another feature, there is employed in combination an arrangement comprising a plurality of the above mandrel assemblies and a pair of the above bellows assemblies for producing a cored molded panel of predetermined outer surface contour as described above and illustrated in detail hereinafter.

The invention will be more clearly understood by reference to the description below of certain embodiments of the invention, taken in connection with the accompanying drawings wherein:

FIG. 1 is a partial perspective view of a cored hybrid foam panel produced employing the pneumatic mandrel assembly of the invention;

FIG. 2 is a perspective view showing an assembly of pneumatic mandrels according to the invention mounted on a header and positioned in a casting cell for producing the cored panel of FIG. 1;

FIG. 3 is a section in elevation of the assembly of FIG. 2, taken on line 3—3 of FIG. 2, showing a pneumatic mandrel within the set panel formed in the casting cell illustrated in FIG. 2;

FIG. 4 is a longitudinal section, shown partly broken away, of a mandrel according to the invention, comprising a hollow tube, and flexible foam sleeve and outer plastic skin secured thereto, mounted on a header;

FIG. 4a illustrates a modified mode of attachment of a mandrel to a header;

FIG. 5 is a detail of the lower end of the assembly of FIG. 4, taken at the circled arrow 5 in FIG. 4;

FIG. 6 is a section taken on line 6—6 of FIG. 4;

FIG. 7 is an exploded view of one mode of fabrication and assembly of the embodiment illustrated in FIGS. 4 and 6, showing a mode of attachment and assembly of the flexible foam sleeve in the form of four strips on the hollow tube, and of the outer skin to the foam sleeve and tube;

FIG. 8 illustrates the assembly of the elements of FIG. 7;

FIG. 9 illustrates a modified form of attachment of the ends of the outer skin to the flexible foam sleeve and the end portions of the tube.

FIG. 10 illustrates a modification of assembly and mounting of the flexible foam sleeve on the mandrel;

FIG. 11 shows the folding of an end portion of the outer flexible skin in the form of a flap in position around the outer end of the foam sleeve;

FIG. 12 illustrates a modification of the manner of adhesively securing the outer skin on the foam sleeve;

FIG. 13 illustrates a modification for formation of the outer skin on the flexible foam sleeve;

FIG. 14 illustrates a modification of the cross sectional configuration of the outer foam sleeve and plastic skin thereon;

FIG. 14a illustrates another feature of the invention for varying the density of the plastic foam sleeve;

FIG. 14b illustrates a modification employing both male and female mandrel assemblies;

FIG. 15 illustrates the pneumatic bellows tool according to the invention;

FIG. 15a is a detail illustrating expansion of the pneumatic bellows of FIG. 15, taken at the circled arrow 15a in FIG. 15;

FIG. 16 illustrates an assembly forming a casting cell, and employing the pneumatic mandrel assembly and the pneumatic bellows assembly tools according to the invention; and FIG. 17 is a perspective view showing the components of FIG. 16 in operative relation in the casting cell of FIG. 16.

Referring to FIG. 1 of the drawing, the pneumatic mandrel and bellows arrangements of the invention are designed particularly for the production of cored molded, e.g., cement or gypsum foam composition, panels of the type indicated at 20, having a plurality of square shaped cores 22 which are separated by integral ribs 24, and which may have roving, e.g., fiberglass roving, illustrated at 26, embedded or molded in the panel.

Referring particularly to FIG. 4 of the drawing, for producing the molded panel 20 of FIG. 1, there is provided according to the invention, a pneumatic mandrel comprising a rigid tube 28 formed of a metal, such as aluminum, which is hollow, with a closure 30 at one end, i.e., the upper end, containing an air passage 31, and an opposite or bottom closure 32, the tube having a square cross section, as seen in FIG. 6, and being provided at spaced intervals along the length of the tube with a plurality of holes 34, there being four such equally spaced holes at each horizontal plane of a plurality of spaced planes containing such holes in the tube or mandrel, including a hole 34 in each side of the square tube in each of such horizontal planes, as best seen in FIG. 6. It will be understood that any number of such holes 34 can be employed in any desired spaced arrangement. Adhesively secured to the outer surface of the tube 28 is a square shaped flexible open-cell, permeable plastic foam sleeve 36 of any suitable flexible foam composition, such as flexible open-cell polyurethane foam. The holes 34 in the tube or mandrel 28 provide fluid communication between the interior of the mandrel and the interior of the open-cell foam sleeve 36. Around the square shaped flexible foam sleeve 36 is adhesively secured an outer flexible fluid or gas impermeable elastomeric skin 38.

The upper closure member 30 of the tube 28 carries a hollow extension 40, which is inserted into and suitably connected as by threaded engagement with a nut 41 and O-ring seal 41', with a header 42, and the tube or mandrel 28, with the elements 36 and 38 mounted thereon, is thus suitably connected and supported on the header 42. The extension 40 is provided with holes or appertures 43 for fluid communication with the interior of the header 42.

There is illustrated in FIG. 4a a modified form of connection for mounting the mandrel assembly on the header 42, comprising an attachment means in the form of a metal sleeve 44 carrying a square shaped lower portion 45 which is press fitted into the upper end of the mandrel 28, and the sleeve 44 is mounted on the header by means of a threaded connection and mating nut 46, the sleeve 44 having holes or apertures 48 therein for communication with the header 42, to provide fluid communication between the interior of the tube or mandrel 28 and the interior of the header.

Referring now particularly to FIGS. 7 and 8 of the drawing, illustrating one mode of assembly of the flexible foam sleeve 36 and flexible plastic skin 38 on the rigid core or mandrel 28, transfer tape or adhesive at 50 is applied to a pair of opposite sides of the square tube or mandrel 28, and the tapes are perforated at 52 for communication with the adjacent holes 34 in the sides of the mandrel 28. Open cell flexible polyurethane foam strips 54 are then applied and adhered to the transfer tapes 52, as seen in FIG. 8. Transfer tapes or adhesive indicated at 56 are then adhered along the outer surfaces of the ends of foam strips 54 and the outer surfaces of the other two opposite sides of the mandrel 28, and the wider elongated strips 58 of open-cell flexible polyurethane foam are then adhered to the transfer tapes 56 which are adhered to opposite end surfaces of strips 54 and to opposite sides of mandrel 28, as illustrated in FIG. 8. Prior to application of strips 58 to transfer tapes 56, holes 57 are made in the tapes 56 adhered to the sides of the mandrel, such holes 57 being in alignment with the adjacent holes 34 of the mandrel. Transfer tapes 50 and 56 are transparent or translucent to permit puncturing the holes 52 and 57 therein in alignment with the adjacent apertures 34 of the tube or mandrel 28.

Transfer tape indicated at 60 is then applied to the entire outside surface of the assembled polyurethane foam strips 54 and 58, as seen in FIG. 8, by means of individual lengthwise tape strips for each side of the polyurethane foam sleeve formed of the foam strips 54 and 58. A non-permeable flexible elastomeric outer sheet or skin 38 is then applied as a single sheet over the tape 60 on all four sides of the foam sleeve 36 formed of the strips 54 and 58, such outer skin being, for example, a polyurethane rubber sheet, e.g., 3 to about 10 mils thick, or a polyethylene film, vinyl chloride polymer film, or a prevulcanized rubber of comparable thickness. Prevulcanized rubber non-permeable sheet has been found particularly effective for use as the outer skin or envelope around the tube and flexible foam assembly, since it is particularly effective in operation and is less subject to damage by abrasion, and is puncture proof.

Referring to FIGS. 4, 5 and 11, the outer opposite extending ends 62 of the flexible skin 38 are each turned over the ends of foam sleeve 36, and then inward, as illustrated at 64, by cutting the end portions of the sheet 38 along the four outer edges thereof and folding inward to form a flap, and the inwardly folded portion 64 is adhesively secured to the transfer tapes 56, 52 secured to the outer surface of the mandrel 28.

In a modification according to FIG. 9, if desired, a separate U-shaped flap 67 of flexible plastic of the same composition as skin 38 can be adhesively secured to the outer ends 69 of the outer skin or sheet 38, extending around the outer ends of the foam sleeve 36, and adhesively secured at 71 to the transfer tape 56, 52 on the outer end surfaces of the tube 28, to render the outer skin 38 air tight.

In accordance with alternative embodiments for forming a flexible non-permeable outer skin on the flexible foam sleeve 36, as illustrated in FIG. 12, an outer flexible non-permeable skin or sheet indicated at 66, can be adhesively secured to and around the outer surface of foam sleeve 36, e.g., by means of transfer tape, as illustrated at 60 in FIG. 7, or by application of adhesive to the outer surface of the foam sleeve 36, and the outer skin 66 rolled around the entire outer surface of the sleeve 36, and the outer edges of sheet 66 lap sealed to each other as illustrated at 68. Alternatively, the outer skin can be formed on the foam sleeve 36 as illustrated in FIG. 13, by dipping the outer surfaces of the foam sleeve 36 in a suitable latex 70 of elastomer provided in a container, and following withdrawal of the mandrel assembly with the latex coated sleeve 38, the latex is cured to form the non-permeable outer skin adhesively secured to the foam sleeve. In a further modification the outer skin can be fabricated as a single seamless piece including the end flaps 62, 64 as shown in FIG. 11 by dipping a suitable tooling form in a latex or solution of a suitable elastomer to form the integral skin including such flaps, and the elastomeric skin thus formed after curing is stretched off the tooling form and stretched over the flexible foam sleeve 36, as illustrated in FIG. 11.

In FIG. 10 is illustrated a further modification for forming the foam sleeve around the mandrel 28. According to this embodiment, a plurality of square shaped foam segments 72 each containing a square aperture 73 therein having the dimensions corresponding approximately to the peripheral outer surface of the square mandrel 28, are progressively mounted on the mandrel in contact with each other and secured to the outer surfaces of the mandrel, e.g., by means of transfer tape or adhesive initially positioned on the outer surfaces of the mandrel. The resulting open-cell foam sleeve 36' is thus formed of the stacked individual foam segments 72, each of which can be secured to adjacent segments, if desired, by means of transfer tape or a suitable adhesive.

In preferred practice, as illustrated in FIGS. 6, 7 and 8, the flexible foam sleeve can be machined at the corners to form rounded or relieved corners as indicated at 74 to improve the ability of the foam sleeve to collapse inward upon application of a vacuum to the interior of the mandrel and the foam sleeve, during operation of the tool, as described in greater detail hereinafter.

It will be understood of course that the flexible foam sleeve can have any desired cross sectional configuration depending upon the cross sectional configuration of the cores which are desired in the cored panel. Thus, although in usual or preferred practice, square shaped cores are formed in a molded panel, as illustrated in FIG. 1, and accordingly square shaped foam sleeves 36 are mounted on the mandrel in accordance with the invention as described above, for producing such square shaped cores, the cores of the cored panel can have other shapes, such as for example, round or hexagonal, and under such conditions, the flexible foam sleeves mounted on the mandrel and the mandrel generally have a corresponding cross sectional shape, such as the hexagonal shapes illustrated at 76 and 28' in FIG. 14, with the outer non-permeable flexible skin 38 adhesively secured thereto as noted above.

In operation, a plurality of pneumatic mandrel assemblies 78 in FIG. 4, comprising the tube or mandrel 28, flexible foam sleeve 36 and flexible plastic outer skin 38, mounted on the header 42, are positioned in a casting cell or mold indicated at 79 in FIGS. 2 and 3, in which a casting or cement composition is to be poured for producing a molded cored panel, as indicated at 20 in FIG. 1. If desired, and in preferred practice, suitable roving, e.g., fiberglass roving, as indicated at 26 in FIGS. 1 and 2, can be positioned in the casting cell or mold 79, as by mounting on a frame of the type illustrated at 102 in FIG. 17, and described hereinafter, prior to introduction of the casting or cement composition into the mold, to reinforce the structural panel to be formed in the mold. However, such roving is optional and may or may not be employed.

Air pressure is applied via header 42 and the interior of the mandrel 28 and via the holes 34 therein to the flexible foam sleeve 36, causing such foam sleeve to expand taut, together with the outer flexible plastic skin 38, as indicated by the arrows in FIG. 5, to the dotted line position A shown in FIG. 6. A casting or cement composition, which, for example, can be a polymer-inorganic hybrid foam, produced according to the process of my copending application Ser. No. 84,943, filed Oct. 28, 1970, by whipping air into a resin emulsion, such as a polyvinyl acetate emulsion, to establish a prefoam of resin emulsion bubbles, and adding an inorganic phase, such as Portland cement or gypsum, is poured into the mold to a predetermined height therein and into contact with the series of mandrel assemblies 78 according to the invention, which are positioned in the mold. It will of course be understood that the pneumatic mandrel of the invention can be employed in producing cored panels formed of any type of casting or cement composition. Upon pouring of the casting composition into the mold, the inflated or expanded flexible foam sleeve 36 and flexible outer plastic skin 38, expanded to the position A illustrated in FIG. 6, resists the static head or pressure of the casting medium or cement composition against the sides of the assembly, and such pressure of the cement composition against the mandrel assembly tends to compress the pressurized expanded foam sleeve 36 and flexible outer skin 38 back approximately to its normal full line essentially square shape illustrated in FIG. 6, thus equalizing the internal and external pressure on the mandrel assembly.

After pouring of the casting material or cement composition, e.g., the polymer-inorganic hybrid foam noted above, into the mold, and after a period of setting of the resulting casting material in the mold sufficient to permit such material to set to a solid self-supporting mass, e.g., a short period of the order of about 10 to about 30 minutes when employing the above noted polymer-inorganic hybrid casting foam, the air pressure applied to the header or manifold 42 is released and a vacuum, e.g., a 10 inch vacuum, is applied to the header and the interior of the mandrel 28, to collapse the open cell foam sleeve 36 and the outer flexible plastic skin 38, and faciliated by the relieved corners 74 of the foam sleeve 36, around the tube or mandrel 28, thus shrinking the foam sleeve 36 and the outer plastic skin 38 so that this assembly becomes undersized, and the outer skin 38 takes the collapsed or shrunken position indicated by the dotted lines B in FIG. 6.

In this shrunken or withdrawn position of the flexible foam sleeve 36 and the outer skin 38, the outer skin 38 is now free from contact with the set adjacent wall of the casting composition with which it was in contact during the pouring and setting of such composition, forming the cores 22 in the cast panel 20. For example, employing a 2 × 2 inch mandrel assembly 78 having a 1 × 1 inch inner aluminum tube 28, the foam sleeve 36 and flexible skin 38 on the mandrel will collapse inwardly at least about ¼ inch. In this collapsed position of the flexible foam sleeve 36 and the flexible outer skin 38 as illustrated at B in FIG. 6, withdrawing same from contact with the adjacent walls of the casting composition, the mandrel assemblies 78 can now be withdrawn with the header 42 from the mold and the cast panel 20, e.g., in the direction of the arrow 81 indicated in FIG. 2, to form the square shaped cores 22 separated by the integral ribs 24, and providing the cored panel 20 illustrated in FIG. 1. Alternatively this arrangement can be inverted and the header 42 can be positioned at the bottom, and the mandrel assemblies withdrawn downward.

After removal of the mandrel assemblies 78 together with the header 42 from the mold and from the cast panel 20, air is readmitted to atmospheric pressure via the header 42, to the interior of the mandrel 28 and the interior of flexible sleeve 36, permitting the flexible sleeve 36 and the flexible outer skin 38 to expand and recover from their collapsed position indicated in dotted lines at B in FIG. 6, to the full line substantially square position indicated in FIG. 6.

It will be noted that the static pressure of the casting medium in the mold against the flexible foam sleeve 36 of the mandrel assembly, increases with the depth of the casting medium in the mold, so that, viewing FIGS. 2 and 4, the static pressure of the casting medium around the lower end of the mandrel assembly 78 is progressively greater than the static pressure at the upper end of the mandrel assembly. According to another embodiment of the invention as illustrated in FIG. 14a, the strips of flexible foam such as 54 and 58 shown in FIG. 7, which are assembled to form the flexible sleeve 36, are initially wedge shaped as indicated by the dotted line 83, in FIG. 14a, and are hot pressed to compress the wedge shaped flexible foam strip at 83 to the rectangular shape indicated at 80, whereby the resulting strips 54' or 58' have a varying density which increases from the right to the left end of the strips 54' and 58' viewing FIG. 14a. Accordingly, when such strips are assembled as illustrated in FIG. 7 to form the flexible sleeve 36, the denser end portions 80' of the strips 54' and 58' to the left in FIG. 14a are positioned adjacent to each other at the lower end of the mandrel assembly so that the resulting flexible sleeve 36 has a density which increases gradually from the upper to the lower end of the mandrel assembly 78, viewing FIGS. 2 and 4. In this modification the pressure which would have to be applied to the flexible foam sleeve 36 can be reduced substantially, requiring much less expansion of the foam sleeve 36 and the outer skin 38 to oppose collapse of the flexible sleeve by the static pressure of the surrounding casting medium or cement composition in the mold.

Further, it will be understood that the mandrel assembly can be of any desired size for production of cores of any desired size, and for example, the mandrel assembly can be very large so as to simulate the entire inside of a room or house. Also, the mandrel assembly, in addition to being a male assembly as illustrated in FIG. 4, can also be a female assembly, as illustrated in FIG. 14b, showing the male mandrel assembly 78 employed in conjunction with an exterior surrounding female mandrel assembly 78a in the form of a large rigid hollow frame or tube 28a attached to its inner surface an open-cell foam member 36a, to the inner surface of which is attached a non-permeable elastomeric skin 38a, the interior of frame 28a communicating with foam member 36a via holes 34a. The female mandrel assembly 78a surrounds and encloses the male mandrel assembly 78 in FIG. 14b, with the space 20a between the two mandrel assemblies to be filled with a casting composition to produce a cored molded panel. Both of the mandrel assemblies can be simultaneously compressed as described above by suitable connection of both assemblies to a source of pressure, during molding of the panel, and following setting of the panel, both mandrel assemblies can be simultaneously deflated to withdraw such assemblies from contact with the molded panel, the male mandrel assembly forming the core of the panel 20a' and the female mandrel forming the outer surfaces of such panel.

Referring now particularly to FIGS. 15 and 15a of the drawing, there is illustrated another feature of the invention in the form of a flexible bellows, for use in an assembly according to the invention for applying pressure to certain members used in forming the outer surfaces or sides of a molded panel, that is for example the sides 82 and 82' of the panel 20 in FIG. 1, and to facilitate removal of the bellows assembly and associated elements from the molded panel, by deflating the bellows.

Thus, the pneumatic flexible bellows 84 of FIG. 15 is formed interiorly of a series of individual layers or segments of an open cell flexible plastic foam such as a polyurethane foam, indicated at 86 in FIG. 15, each of such segments or layers 86 of flexible foam being disposed or positioned within a separate corrugation 88 of a corrugated, flexible air tight and strong material, which can be metallic or non-metallic, e.g., rubber, forming a flexible corrugated outer housing or bellows member 90. At the boundary between each corrugation within the interior of the bellows and separating adjacent segments or layers of foam 86, is a strong permeable flexible tensioning sheet, e.g., a fiberglass scrim sheet, 91, which is bonded by suitable means such as a polyurethane adhesive, to the adjacent polyurethane foam segments or layers 86. Such tensioning sheet is also bonded at its extremities 91a between flexible scrim sheets 91b each of which extends around the interior surfaces of the corrugations 88, as at 93, and is also securely bonded to the interior surface thereof. The tensioning or fiberglass scrim sheet or layer 91 between the adjacent layers or segments of foam 86, and scrim sheets 91b secured to the corrugations 88, function as a tension form control member when the interior of the bellows is subjected to air pressure and is expanded in the direction indicated by arrow D in FIG. 15 to the position shown in FIG. 15a, to maintain the general form of the bellows during such expansion.

Alternatively, instead of foam segments 86 and scrim sheet 91, a permeable flexible foam such as polyurethane can be formed in place, e.g., as a single unit, in the interior of the bellows 84 cintaining any suitable tensioning members equivalent to scrim sheet 91 across the interior of the bellows, so that such tensioning members are embedded in the foam filling the interior of the bellows.

In FIG. 15, a header 92 is disposed around the periphery of the bellows 84 at one end thereof, the header 92 being perforated or having a series of perforations or holes 94 therein to provide fluid communication between the interior of the header 92 and the interior of the bellows 84. The header 92 is secured in suitable manner as by bonding or cementing to one end of the bellows 84. Air pressure introduced into the bellows via the header 92 passes through the open cell foam segments or layers 86 and the permeable tensioning, e.g., fiberglass scrim, sheets 91 between adjacent layers of foam 86, throuhgout the entire bellows, so that expansion of the bellows under pressure causes expansion of each of the polyurethane foam layers 86 and ballooning of the respective corrugations 88 defining the outer perimeter of each foam layer 86, as indicated in FIG. 15a. A plate, e.g., a honeycomb panel, 96 is suitably attached to the opposite end of the bellows from the header 92, and as described below, functions as the pressure member in forming the molded sides of a structural panel.

A pair of bellows 84 are each mounted opposite each other in a "C" frame 98, as illustrated in FIG. 16, providing a space or casting cell 100 between the bellows, the frames 98 being bolted together at 110 at adjacent flanges 112 on the "C" frames to form a "O" frame 114, the two bellows 84 being arranged in the "O" frame so that the plates or honeycomb members 96 carried thereon are disposed adjacent each other and defining the casting cell space 100.

Viewing FIGS. 16 and 17, in casting a reinforced cored structural panel of the type illustrated in FIG. 1, a perimeter frame indicated at 102 having top and bottom members 116 and 118 and end members 120 connected together, is provided, with fiberglass roving 26 strung in suitable position both longitudinally and transversely across the frame. The top member 116 of the frame is hollow and forms a header 122 on which are mounted the square mandrel assemblies 78 illustrated in FIG. 4. The mandrel assemblies 78 extend downwardly from header 122 into the perimeter frame 102 and between the two planes 26a and 26b of roving 26 as illustrated in FIG. 1, strung across the perimeter frame, each of such planes of roving being close to the outer sides 106 of the perimeter frame, to provide the two planes of roving adjacent the outer surfaces of the molded panel as shown in FIG. 1.

The perimeter frame 102 with the roving 26 strung across the frame, and the header 122 and mandrel assemblies 78 positioned in the frame, are placed in the casting cell 100 between the bellows 84 in the paired "C" frames 98, as illustrated in FIGS. 16 and 17, with the opposite sides of the perimeter frame 102 disposed adjacent to but spaced from the honeycomb panels 96 carried on the bellows 84.

Air pressure is applied via the header 92 of each of bellows 84 to the interior of both of the bellows 84, causing the bellows to expand in the direction towards each other, viewing FIGS. 16 and 17, and as indicated by arrow D in FIG. 15, and forcing the honeycomb panels 96 carried on each of the bellows toward each other against the opposite longitudinal sides 106 of the perimeter frame 102. This forms the casting cell 100 defined by the perimeter frame members and the opposite honeycomb panels 96 disposed adjacent the perimeter frame. Concurrently with the application of pressure to the bellows 84, pressure is also applied to the mandrel assemblies 78 as described above, to expand the flexible sleeve 36 and outer flexible skin 38 thereof, as illustrated at A in FIG. 6.

A suitable casting material, e.g., the polymerinorganic hybrid foam of my above copending application, at 108 is introduced via a suitable opening 104 in the top 116 of the perimeter frame 102, or alternately pressure injected through an opening such as 125 in a side member 120 of the frame near the bottom of the casting cell, into the space or volume defined within the interior of the perimeter frame 102 and between the honeycomb panels 96, and around the mandrel assemblies 78 disposed within the perimeter frame, and the casting material is permitted to set therein. The fiberglass scrim sheets 91 between the foam segments 86 of the bellows provides uniform resistance to bending of the bellows from the static head of the casting material during casting and also permits only axial motion of the bellows while restraining lateral motion thereof. This permits the use of a relatively thin contact plate or honeycomb panel 96 for contact with the casting material.

Following sufficient setting of the casting material so that the resulting panel formed within the perimeter frame 102 is self-supporting, the pressure in the headers 92 of the bellows 84 is released, thus contracting the bellows in the direction indicated by the arrow E in FIG. 15a, to their normal unexpanded position shown in FIG. 15a, and withdrawing the honeycomb panels 96 away from the perimeter frame. The perimeter frame containing the mandrel assemblies 78 and supporting header 42, together with the molded panel 20 as seen in FIG. 1, is removed from the "O" frame 114 by a supporting conveyor indicated at 124, and the pressure is relieved in the header 122 and the mandrel assemblies 78, permitting withdrawal of the mandrel assemblies 78 together with header 122 from the perimeter frame and from the molded panel formed therein, and providing the square cores 22, noted in FIG. 1. Thereafter, the cored panel 20 having the smooth outer sides 82 and 82' formed by contact of such sides with the honeycomb panels 96, and the square shaped cores 22 formed by the mandrel assemblies 78, is removed from the perimeter frame 102.

If desired, the flexible foam segments 86 of the bellows can be formed as described above and illustrated in FIG. 14a, of varying and gradually increasing density from the top of the bellows as shown in FIG. 15 to the bottom thereof, to aid in resisting the static pressure of the surrounding casting medium in the mold.

If the sides 82 and 82' of the molded panel are to be faced with artistic designs and the like, appropriately surfaced plates (not shown) can be mounted by vacuum chucking on the contact or honeycomb plates 96 of the bellows assemblies 84 to provide the faced side surfaces of the molded panel, corresponding to the smooth sides 82 and 82' of the panel 20 obtained employing the smooth flat honeycomb plates 96.

From the foregoing, it is seen that the invention provides simple relatively inexpensive pneumatic tools, in the form of pneumatic mandrels and bellows, separately or in combination, together with associated elements, to facilitate the production particularly of large cored structural composition panels having smooth surfaces or surfaces of any desired configuration, rapidly and economically.

While I have described particular embodiments of my invention for purposes of illustration, it will be understood that various changes and modifications can be made therein within the spirit of the invention, and the invention accordingly is not to be taken as limited except by the scope of the appended claims.

I claim:

1. A pneumatic mandrel assembly for production of cored molded parts, which comprises a mandrel in the form of a hollow rigid polygonal shaped tube, a flexible fluid permeable member, said fluid permeable member being throughout a flexible fluid permeable sleeve of substantial thickness positioned around and adhesively secured to the outer periphery of said tube, said fluid permeable sleeve having a cross section of outer polygonal shape, the corners of said polygon shaped fluid permeable sleeve being rounded or relieved to facilitate collapse of said sleeve by application of a vacuum to said sleeve, the lower end of said flexible fluid permeable sleeve being the more dense end, the density of said sleeve increasing along the length of said sleeve from the upper end to the opposite lower end thereof, a thin outer flexible elastomeric non-permeable sheet adhesively secured over and around the outer periphery of said sleeve, said tube being apertured and providing fluid communication between said tube and said sleeve, and pneumatic means connected to said tube to apply fluid pressure or a vacuum to the interior of said tube and said sleeve.

2. A pneumatic mandrel assembly as defined in claim 1, wherein said tube has a substantially square cross section and said flexible sleeve has a substantially square cross section.

3. A pneumatic mandrel assembly as defined in claim 1, wherein said outer flexible sheet is substantially coextensive with the length of said flexible sleeve, said sleeve and said outer sheet extending substantially the entire length of said tube, the apertures in said tube being spaced along the length of said tube.

4. A pneumatic mandrel assembly as defined in claim 3, wherein said flexible fluid permeable sleeve is formed of open-cell flexible plastic foam.

5. In combination, a pair of pneumatic mandrel assemblies, each of said assemblies comprising a mandrel in the form of a hollow rigid polygonal shaped tube, a flexible fluid permeable member, said fluid permeable member being throughout a flexible fluid permeable sleeve of substantial thickness positioned around and adhesively secured to the outer periphery of said tube, said fluid permeable sleeve having a cross section of outer polygonal shape, the corners of said polygon shaped fluid permeable sleeve being rounded or relieved to facilitate collapse of said sleeve by application of a vacuum to said sleeve, a thin outer flexible elastomeric non-permeable sheet adhesively secured over and around the outer periphery of said sleeve, said tube being apertured and providing fluid communication between said tube and said sleeve, and pneumatic means connected to said tube to apply fluid pressure or a vacuum to the interior of said tube and said sleeve, the first of said pneumatic mandrel assemblies being positioned around and spaced from the said second of said pneumatic mandrel assemblies for production of a cored molded panel in the space between said first and second mandrel assemblies, the cored portion of said panel being provided by said second mandrel assembly and the outer surface of said panel being formed by said first mandrel assembly.

6. A pneumatic mandrel assembly as defined in claim 4, the ends of said outer flexible plastic sheet being turned and folded back to form an inner flap, said inner flaps being adhesively secured to the adjacent outer end surfaces of said tube.

7. A pneumatic mandrel assembly as defined in claim 4, said flexible plastic foam sleeve being a flexible open-cell polyurethane foam and said outer non-permeable flexible sheet being a flexible prevulcanized rubber envelope.

8. A pneumatic mandrel assembly as defined in claim 4, said flexible plastic foam sleeve being a flexible open-cell polyurethane foam and said outer non-permeable flexible sheet bieng a flexible prevulcanized rubber seamless envelope.

9. A pneumatic mandrel assembly as defined in claim 4, wherein said tube has a substantially square cross section and said flexible plastic sleeve has a substantially square cross section, said tube containing a plurality of apertures disposed around said tube substantially in a plane, including a plurality of planes of said apertures at a plurality of predetermined locations along the length of said tube.

10. A pneumatic mandrel assembly as defined in claim 9, said tube containing a closure at one end and a connection at the other end for fluid communication with said pneumatic means connected to said tube.

11. A pneumatic mandrel assembly as defined in claim 10, said flexible plastic foam sleeve being a flexible open-cell polyurethane foam and said outer non-permeable flexible sheet being a flexible prevulcanized rubber sheet.

* * * * *